United States Patent
Kasha

(10) Patent No.: US 10,085,103 B2
(45) Date of Patent: Sep. 25, 2018

(54) MUSIC ENHANCING DEVICE FOR SOUND SYSTEMS

(71) Applicant: John Michael Kasha, Simi Valley, CA (US)

(72) Inventor: John Michael Kasha, Simi Valley, CA (US)

(73) Assignee: Kai Technologies, Inc., Simi Valley, CA (US)

( * ) Notice: Subject to any disclaimer, the term of this patent is extended or adjusted under 35 U.S.C. 154(b) by 0 days.

(21) Appl. No.: 15/348,650

(22) Filed: Nov. 10, 2016

(65) Prior Publication Data

US 2017/0142534 A1    May 18, 2017

Related U.S. Application Data

(60) Provisional application No. 62/255,209, filed on Nov. 13, 2015.

(51) Int. Cl.
*H04R 5/00*    (2006.01)
*H04S 3/00*    (2006.01)
*G06F 3/16*    (2006.01)
*H04R 5/04*    (2006.01)

(52) U.S. Cl.
CPC .............. *H04S 3/002* (2013.01); *G06F 3/162* (2013.01); *H04R 5/04* (2013.01); *H04S 2400/09* (2013.01)

(58) Field of Classification Search
CPC ........ H03F 3/68; H03F 2200/03; H03F 3/181; H04R 5/04; H04S 3/002; H04S 2400/09

USPC ...................................... 381/28, 120, 77, 97
See application file for complete search history.

(56) References Cited

U.S. PATENT DOCUMENTS

| | | | | | |
|---|---|---|---|---|---|
| 4,837,825 | A | * | 6/1989 | Shivers | H04R 5/02 381/303 |
| 5,627,902 | A | * | 5/1997 | Ziarati | G01R 33/283 181/129 |
| 6,118,876 | A | * | 9/2000 | Ruzicka | H04R 5/04 381/18 |
| 9,071,897 | B1 | * | 6/2015 | Johnston | H04R 5/02 |
| 9,473,861 | B1 | * | 10/2016 | Ryan | H04R 25/556 |
| 2016/0066093 | A1 | * | 3/2016 | Fisher | H04R 5/04 381/80 |

* cited by examiner

*Primary Examiner* — Disler Paul
(74) *Attorney, Agent, or Firm* — Gregory B. Wood

(57) ABSTRACT

A portable sound enhancement module for interconnection between a stereo signal source and a sound generator such as stereo headphones, includes an audio driver with a positive left input, a negative left input, a positive right input and a negative right input, the positive right input and the positive left input of the audio driver and the negative left signal and the negative right signal source are coupled to ground. The positive left signal is coupled to the negative left input and the positive right signal is coupled to the negative right input. The enhancement module includes a battery, a charger and a programmable controller. The controller sets the amplification level for the audio driver, indicates the state of the battery charge and turns the enhancement module on and off in response to predefined criteria. The sound generator is coupled to receive the right output signal and the left output signal from the enhancement module and generate enhanced sound in accordance with the invention.

12 Claims, 4 Drawing Sheets

MUSIC ENHANCING DEVICE FOR SOUND SYSTEMS

CROSS-REFERENCE TO RELATED APPLICATIONS

This non-provisional patent application claims the benefit of U.S. Provisional Patent Application Ser. No. 62/255,209, filed on Nov. 13, 2015, which is incorporated herein by reference in its entirety.

BACKGROUND OF THE INVENTION

Technical Field

This invention relates to an electronic, system for enhancing the sound experience by a user through phase alteration and noise rejection circuitry coupled between an audio signal source and a sound generator.

Background Art

The audio reproduction systems continue attempts to overcome imperfections inherent in the reproduction of sound to enhance the audio experience of music enthusiast, professional audiophiles, professional recording engineers, performers and those who simply appreciate high quality audio. For example, one common imperfection is that the recording of sounds emanating from multiple locations is not properly reproduced in an audio system. This imperfection has been address by systems such as surround sound systems which have multiple recording tracks. The multiple recording tracks are used to record the spatial information associated with sounds which emanate from multiple locations. However, such systems are typically require multiple recording tracks and multiple speaker arrangements rendering such systems of limited use to enhance audio reproduction for head phone or non-surround sound speaker systems.

Other sound enhancement systems such as described in U.S. Pat. No. 8,379,901 rely on the physical structure and arrangement of speakers in a physical space.

To enhance sound in conventional two-speaker systems, attempts to simulate a surround sound experience by introducing unnatural time-delays or phase-shifts between left and right signal sources have been used. However, such systems often suffer from unrealistic effects in the reproduced sound.

Other systems use various other electronic processing techniques such as the one described in U.S. Pat. No. 7,248,702 which generates artificial harmonics which are amplified to emphasize "attack transients occurring within the input signal."

Other sound enhancement systems use "sum" and "difference" audio signal processing such as described in U.S. Pat. Nos. 4,748,669 and 4,866,774. However, the creation and processing of the sum and difference signals usually requires complicated circuitry and are not useful in portable systems or as a plug in accessory device.

Accordingly, there is a need for a simple plug-in enhancement module which can be interconnected between an audio portable source such as a smart phone or radio or TV with and the audio generating device such as headphones or powered speakers to create an enhanced sound experience for the listener using a simple plug enhancement module.

There is also a need for an enhancement module that excites the human audible frequencies evenly without needing to change individual frequencies manually, that is, without a need for an audio equalizer to obtain the enhanced sound.

The enhancement module is powered by a battery that can be recharged using a standard USB micro cable plugged into a PC USB type A connector or using an AC to DC USB adapter.

DISCLOSURE OF THE INVENTION

A sound enhancement system includes a stereo signal source with a positive left signal, a negative left signal, a positive right signal and a negative right signal; a sound generator for generating an audible sound and an enhancement module between the stereo signal source and the sound generator. The enhancement module includes an audio driver with a positive left input, a negative left input, a positive right input and a negative right input. In accordance with the invention, the positive right input and the positive left input of the audio driver are coupled ground. Likewise, the negative left signal and the negative right signal from the stereo signal source are also coupled to ground. The positive left signal is then coupled to the negative left input and the positive right signal is coupled to the negative right input. The audio driver includes an amplifier coupled to amplify the positive right signal the positive left signal provided at the negative right input and the negative left input to generate at the output of the audio driver a phase swapped right output signal and a phase swapped left output signal. The audio driver which is generally an available circuit, preferably includes noise rejecter circuitry for rejecting supply and RF noise in the right output signal and the left output signal. The enhancement module also includes a battery for supplying power to the audio driver, a battery charging circuit for charging the battery when the battery charge is low, a low charge sensor for providing a low charge signal when the battery charge is below a predefined level, a display, a programmable controller coupled to the audio driver for selecting the audio driver amplification and further coupled to the battery charger and the display for displaying an indication of a low battery charge in response to the low charge signal, an indication when the battery is connected to an external power source and is charging, and an indication when the battery is fully charged and the external power source can be disconnected. The sound generator is coupled to receive the right output signal and the left output signal from the enhancement module and generating enhance sound in accordance with the invention.

The resultant system generated enhanced sound without the need for an equalizer or change individual frequencies relative to the input audio signals. Apparently due to the interplay of the noise rejection and the phase swapping aspect of the interconnect of the audio driver and the stereo signal source, the listener experiences enhanced sound from the sound generator which has increased clarity and sound separation particularly with lyrics which gives the listener a significantly greater sense of being in a live performance.

BRIEF DESCRIPTION OF THE DRAWINGS

For a more complete understanding of the present invention and the advantages thereof, reference is made to the following description taken in conjunction the accompany drawings wherein like reference numerals represent like parts, in which.

MODES FOR CARRYING OUT THE INVENTION

Figure 1:
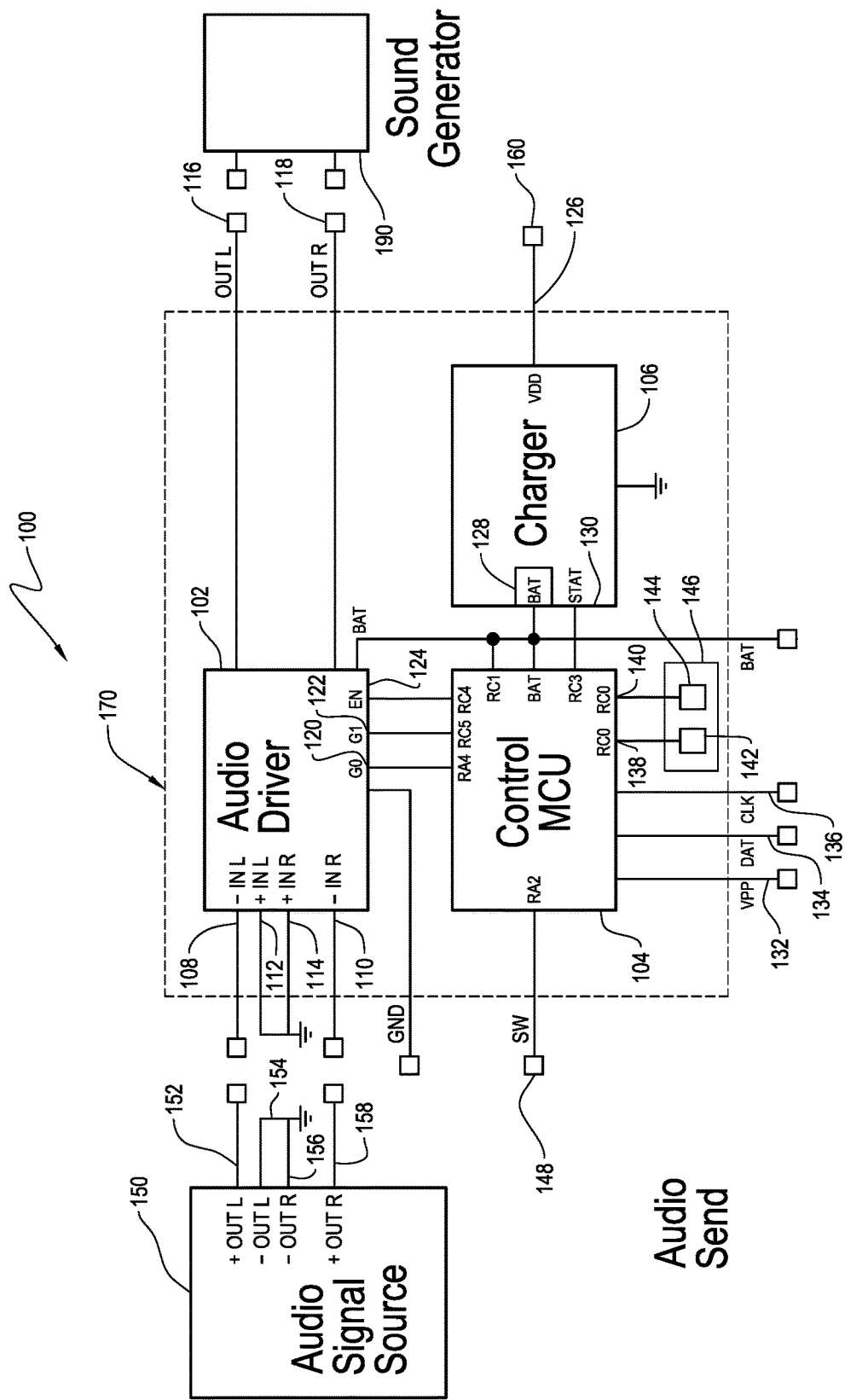
FIG. 1 is a simplified block diagram of the audio enhancement system which includes an audio enhancer defined by an audio driver, a control MCU and a charger, coupled between an audio signal source and a sound generator.

Referring to FIG. 1, a simplified block diagram of an audio enhancement system 100 is illustrated having an audio signal source 150 which provided stereo audio signals to an audio enhancement module 170 which provides enhance audio to a sound generator 190. The audio enhancement module 170 includes an audio driver 102, a control MCU 104 and a charger 106. The audio driver 102 has a left negative input 108, a right negative input 110, a left positive input 112 and a right positive input 114. The audio driver also has a left output 116 and a right output 118 from which the enhanced audio is provided to a suitable speaker or other sound system. The audio driver also includes G0 and G1 control signal inputs 120 and 122 respectively, for enabling the gain of the audio driver output relative to the input to be selected at 0, +3 db or +6 db. An EN control signal 124 enable the Audio driver to be turned on or off in response to predefined criteria such as a duration period of non-use for power savings.

The charger 106 includes power input port 126 such as a USB or other suitable port to receive external 5 v power to charge a battery 128 which supplies power to the Audio Driver 102 and the Control MCU 104. The charger also includes an STAT output port 130 which provides a status signal to the control MCU 104 to enable the control MCU to generate control signals at Control MCU output 138 and 140 indicating the charge status of the battery 128.

The control MCU 104 includes programming inputs 132, 134 and 136 through which a programmer programs the control MCU to perform a wide variety of control functions. For example, the control MCU can be programmed to provide gain control signals to the audio driver inputs 120 and 122 to set the gain of the audio driver; to enable or disable power to the audio driver 102; to turn the power to the audio enhancement system on or off in response to a timer or in response to the absence or presence of an audio signal input; and to provide status signals on display outputs 138 and 140 to indicate, for example, whether the battery 128 is being charged, is fully charge or is at a low charge indicating the need to recharge the battery. The display outputs 138 and 140 are coupled to a display 146 which may be LED lights 142 and 144.

In operation, the audio signal source 150 typically provides amplified stereo outputs consisting of four signals: plus out left signal 152, minus out left signal 154, plus out right signal 158, and minus out right signal 156. To be compatible with requirements of an analog audio driver 102, at least the plus out left and plus out right signals 152 and 158 must be analog signals or be converted to analog signals. The plus out left signal 152 is then coupled to the left negative input 108 of the audio driver 102 and the plus out right signal 158 is coupled to the right negative input 110 of the audio driver 102 with the minus out right and minus out left signals 156 and 154 being couple to ground and the left and right positive inputs 112 and 114 likewise being coupled to ground. The result is that the signals provided to the sound generator 190 from the right and left outputs 116 and 118 will be phase shifted relative to the outputs from the audio signal source 150.

The sound generator 190 can be any device that can be coupled to receive the right and left outputs 116 and 118 to create responsive audible sound for a listener. One audio drive circuit that can be used as an audio driver is the Maxim, MAX 97220A chip. An electronic circuit that can be used to perform the function of the control MCU is the Silicon Lab, EFM8LB12F64E-B-QFN32R. Finally, a LiON TI, BQ21040DBVR chip could be used for the charger component. Other chips with analogous functionality can also be used in accordance with the invention.

Figure 2:
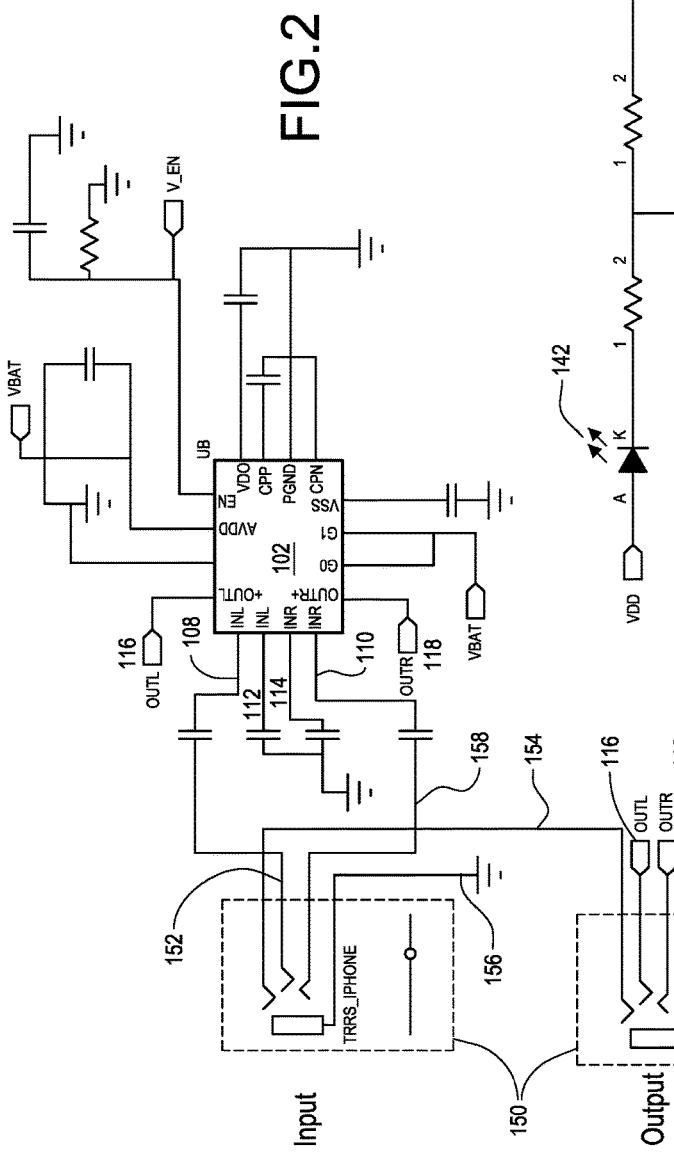
FIG. 2 is detailed schematic of the connection of the audio driver of the audio enhancement system to a typical smart phone.

Referring to FIG. 2, a representative schematic of a signal source 150, such as an iPhone™ or other smart phone, to the audio driver 102 is illustrated showing the plus out left signal 152 coupled to the left negative input 108 of the audio driver 102 and the plus out right signal 158 coupled to the right negative input 110 of the audio driver 102 with the minus out right and minus out left signals 156 and 154 being couple to ground and the left and right positive inputs 112 and 114 of the audio driver being coupled to ground. An arrangement of resistors, capacitors and the like that could be used to incorporate an audio driver in the audio enhancement system is illustrated but will be known to those skilled in the art. A typical audio driver having and amplification and supply and RF noise rejection describe and that may be used in the invention is described in U.S. Pat. No. 5,289,137.

Figure 3:
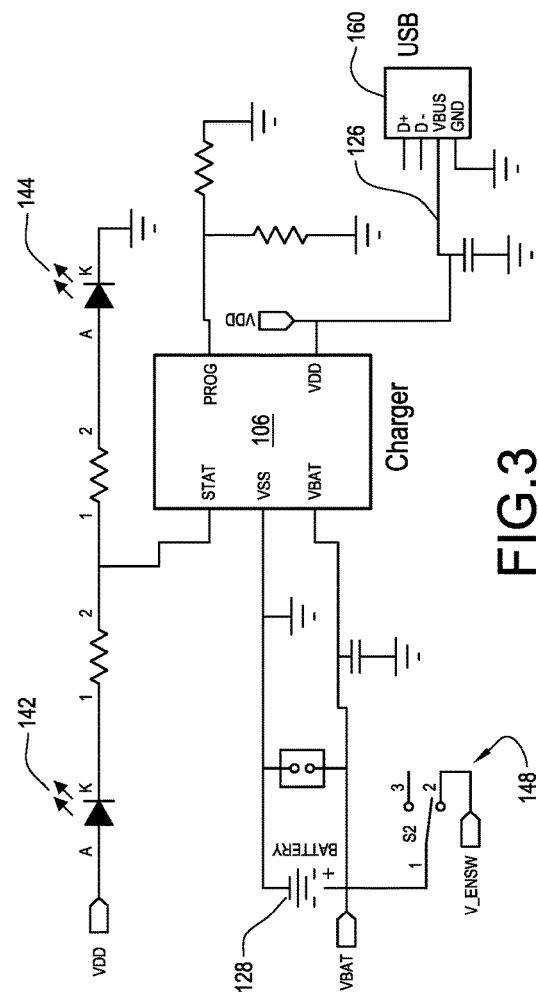
FIG. 3 is a detailed schematic of the battery charger of the audio enhancement system.

Referring to FIG. 3, a schematic circuit for a charger 106 is illustrated showing additional detail of a charger 106 and related components including a typical USB connector 160 for receiving external power on input 126 to recharge the battery 128, the on-off power switch 148, the rechargeable battery 128, and the display consisting of two LED lights 142 and 144.

FIGS. 4-10 show variously configurations of the sound enhancement system and incorporating the enhancement module that can be used by music enthusiast, professional audiophiles, professional recording engineers and performers and even those who simply appreciate high quality music. As above described, the enhancement module has a stereo input and output that receives an audio signal, enhances it, and sends the resultant enhanced audio signal to, e.g., headphones or power speakers to create an enhanced sound experience for the listener.

Figure 4:
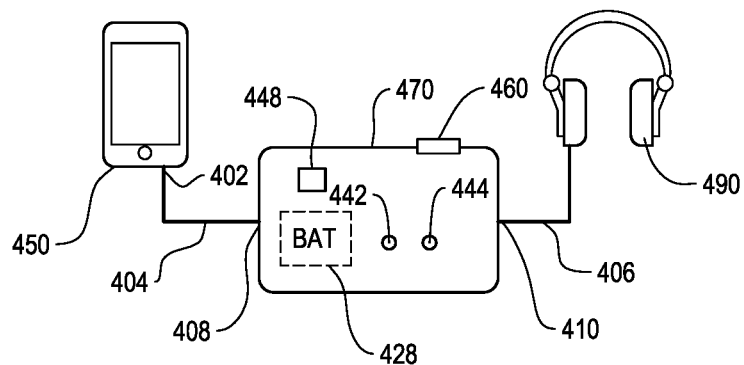
FIG. 4 is a pictorial view of the audio enhancement system coupled between a smart phone and headphones.

Referring to FIG. 4, the sound enhancement system includes in its simplest configuration the enhancement module 470 coupled by cable 404 to a smartphone 450 (which could alternatively be PC or MP3 player or any other audio signal source) at the input 408 of the enhancement module 470 to receive audio signals from the smart phone 450 and further couples to enhancement module output 410 to headphones 490 by cable 406. The enhancement module 170 is preferably powered by a lithium polymer battery 428 that can be recharged using a standard USB micro cable (not shown) plugged into a PC USB type A connector 460 or an AC to DC USB adapter as is common to recharge battery powered devices. When the charge on battery 428 is low, one or both LEDs 442 and 444 will illuminate alerting the user to plug power into the port 460 to recharge the battery 428. For example, LED 442 can be connected to light red when the battery charge is low and LED 444 can light green to indicate the battery is fully charged. The cables 404 and 406 may be audio tip-ring-ring-sleeve (TRRS) 3.5 millimeter shielded.

Figure 5:
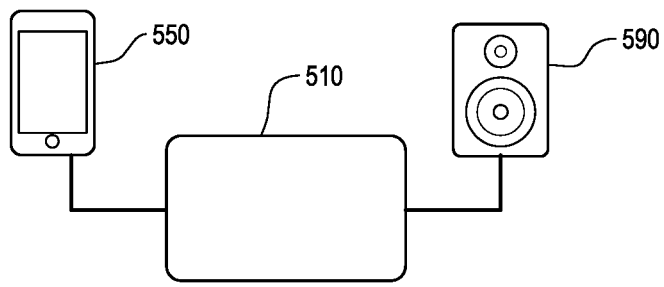
FIG. 5 is a pictorial view of the audio enhancement system coupled between a smart phone and powered speakers.

Another embodiment of the sound enhancement system is shown in FIG. 5 but incorporating powered speakers 590 rather than headphones to provide the audible sound.

Figure 6:
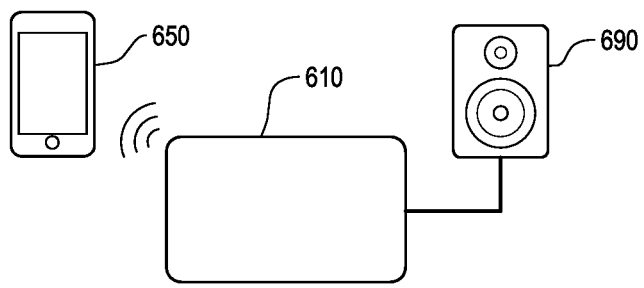
FIG. 6 is a pictorial view of the audio enhancement system wirelessly coupled to a smart phone and further coupled to powered speakers.

FIG. 6 illustrates another system embodiment where connection between an audio signal source 650 sound source and an enhancement module 610 is made using wireless Bluetooth technology and specifically Bluetooth 4.0 in accordance with well-known Bluetooth protocols. Other wireless connectivity technologies can also be incorporated including WiFi or other radio technologies.

Figure 7:
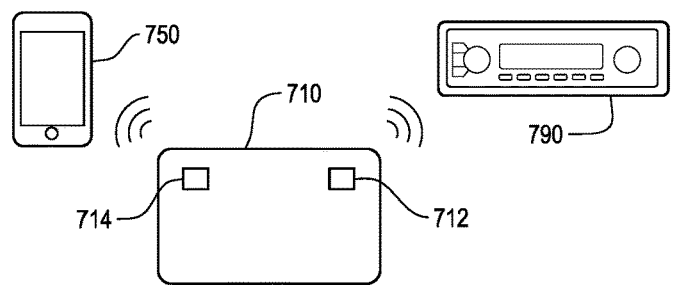
FIG. 7 is a pictorial view of the audio enhancement system where the coupling to both the smart phone and a radio is wireless.

In the same manner, wireless connections can also be incorporated between the enhancement module and sound generating devices 790 as shown in FIG. 7. In the system illustrated in FIG. 7 the enhancement module 710 will include two Bluetooth transmitting devices 712 and 714. Both Bluetooth devices 712 and 714 will broadcast their ID that will be received by compatible Bluetooth receiving devices such as a smart mobile or MP3 player 750 on the input side and a car radio, TV, Game systems or stereo system 790 on the output side, using standard Bluetooth connection protocol.

Figure 8:
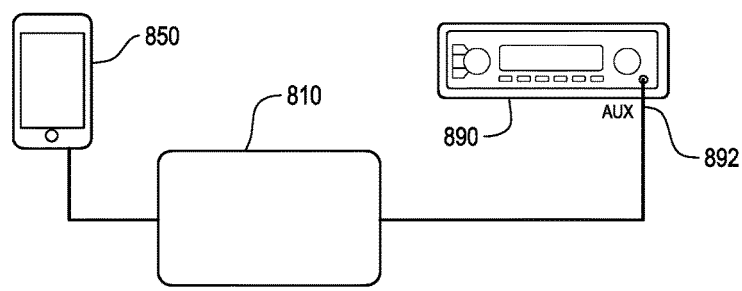
FIG. 8 is a pictorial view of the audio enhancement system in audio system of a vehicle where the output of the enhancement system is coupled between vehicle radio and the power amplifies for the vehicle speakers.

In FIG. 8 an enhancement module 810 is used to enhance the audio generated through a radio system such as one used in a vehicle. That that embodiment, the enhancement module 810 is coupled to smartphone or MP3 player 850 as previously described. The output from the enhancement module with then be coupled by a cable to the auxiliary input 892 of a radio system 890. The connection between the audio signal generator 850 and the sound generator 890 can also be made using wireless technology as above describe.

Figure 9:
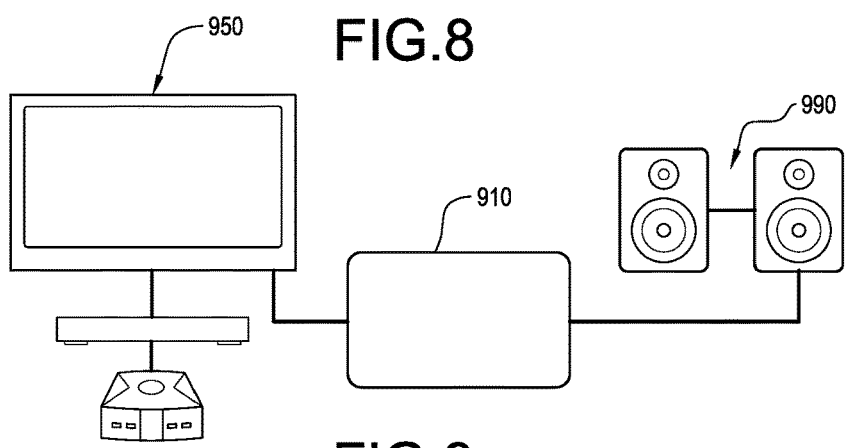
FIG. 9 is pictorial view of the audio enhancement system coupled between the audio output of an entertainment system and the powered speakers of the entertainment system

As shown in FIG. 9, an enhancement module 910 can also be coupled between an audio signal source of an entertainment system 950 and the entertainment system speakers 990 either with wired or wireless connections to thereby enhance the audio experience for the listener from a TV, game system and digital media streaming devices such as a DVD, Blu-ray, Video or Set Top box systems. The enhancement module input will plug into the auxiliary output, preamp output or headphone output. The enhancement module output will connect to the input of a powered speaker system 990.

Figure 10:
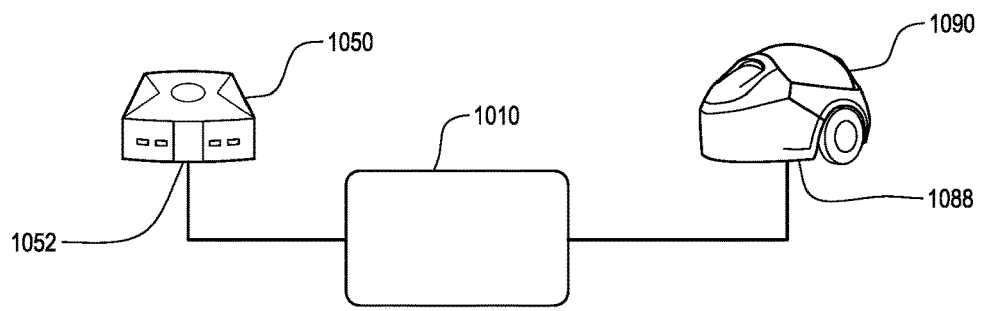
FIG. 10 is pictorial view of the audio enhancement system coupled between the audio output of a game console and a virtual reality head set.

In a virtual reality system as illustrated in FIG. 10 the enhancement module 1010 can be coupled between and output 1052 of a virtual reality audio input source 1050 such as a gaming system, TV or PC by connection to an auxiliary output, preamp output or headphone output 1052. The enhancement module 1010 output will then connect to an audio input 1088 of the virtual reality headset 1090.

The illustrative apparatus, devices and systems and their interconnections that have be disclosed in accordance with the present sound enhancement system and enhancement module invention show the objects and advantages set forth above. Although the embodiment illustrated have been described in detail, various changes, substitutions, and alterations can be made and such will be understood by those skilled in the art. As another example, some components have been illustrated integral with other components. However, it will be understood that such components could be coupled together via an intermediate component rather than being directly connected to one another. Further, it will be understood that while one enhancement module has been illustrated, two or more modules could be coupled in series to provide greater enhancement. Other examples are readily ascertainable by one skilled in the art and could be made without departing from the spirit and scope of the present invention as defined by the following claims.

What is claimed is:

1. A sound enhancement system for being couple to an external power source comprising:
   a. A stereo signal source for providing an electronic audio signal having a positive left signal, a negative left signal, a positive right signal and a negative right signal,
   b. An enhancement module coupled to the stereo signal source for receiving the electronic audio signal and providing an enhanced audio signal, the enhancement module comprising
      i. An audio driver having a positive left input, a negative left input, a positive right input and a negative right input, the positive right input and the positive left input coupled with the negative left signal and the negative right signal to ground and the positive left signal coupled to the negative left input and the positive right signal being coupled to the negative right input to create a signal phase swap, the audio driver having an amplifier coupled to amplify the positive right signal the positive left signal to generate a phase swapped right output signal and a phase swapped left output signal, the audio driver further having noise rejecter circuitry for rejecting supply and RF noise in the right output signal and the left output signal,
      ii. A battery for supplying power to the audio driver;
      iii. A battery charging circuit for charging the battery;
      iv. A low charge sensor for providing a low charge signal when the battery charge is below a predefined level;
      v. A display;
      vi. A programmable controller coupled to the audio driver for selecting the audio driver amplification; further coupled to the battery charger and the display for displaying an indication of a low battery charge in response to the low charge signal, an indication when the battery is connected to the external power source and is charging, and an indication when the battery is fully charged and the external power source can be disconnected;
   c. An audible sound generator coupled to receive the right output signal and the left output signal.

2. The sound enhancement system of claim 1 wherein the audio driver has no equalizer.

3. The sound enhancement system of claim 1 wherein the signal source is coupled to the inputs of the enhancement module using a first cable and the output signals are coupled to the sound generator using a second cable.

4. The sound enhancement system of claim 1 wherein the signal source is a wireless signal source and the sound enhancement module further comprises a wireless communication receiver for wirelessly coupling the inputs of the enhancement module to the signal source.

5. The sound enhancement system of claim 1 wherein the sound enhancement module further comprises a wireless communication transmitter for coupling the output signals to the sound generator wirelessly.

6. The sound enhancement system of claim 1 wherein the stereo signal source is one of a mobile smart phone device, a home entertainment system, a computer, or an electronic game system.

7. An equalizer free sound enhancement module for being coupled between a stereo signal source which provides an electronic audio signal having a positive left signal, a negative left signal, a positive right signal and a negative right signal and a sound generator for generating audible sound coupled to receive the right output signal and the left output signal,
   a. An enhancement module coupled to the stereo signal source for receiving the electronic audio signal and providing an enhanced audio signal, the enhancement module comprising:
      i. An audio driver having a positive left input, a negative left input, a positive right input and a negative right input, the positive right input and the positive left input coupled with the negative left signal and the negative right signal to ground and the positive left signal coupled to the negative left input and the positive right signal being coupled to the negative right input to effect a signal phase swap at the input of the audio driver, the audio driver having an amplifier coupled to amplify the positive right signal and the positive left signal to generate a phase swapped right output signal and a phase swapped left output signal, the audio driver further having noise rejecter circuitry for rejecting supply and RF noise in the right output signal and the left output signal,
      ii. A battery for supplying power to the audio driver,
      iii. A battery charger for charging the battery;
      iv. A low charge signal generator for generating a low charge signal when the battery charge is below a predefined level;
      v. A display;
      vi. A programmable controller coupled to the audio driver for selecting the audio driver amplification; further coupled to the battery charger and the display for displaying an indication of a low battery charge in response to the low charge signal, an indication when the battery is connected to the external power source and is charging, and an indication when the battery is fully charged and the external power source can be disconnected; and
   b. The right output signal and left input signal coupled to the sound generator to generate the audible sound.

8. The sound enhancement module of claim 7 further comprising a first cable for coupling the signal source to the inputs of the enhancement module and a second cable for coupling the output signals to the sound generator.

9. The sound enhancement module of claim 7 wherein the signal source is a wireless signal source and the sound enhancement module further comprises a wireless communication receiver for wirelessly coupling the inputs of the enhancement module to the signal source.

10. The sound enhancement module of claim 7 wherein the sound enhancement module further comprises a wireless communication transmitter for wirelessly coupling the output signals to the sound generator.

11. The sound enhancement module of claim 7 where in the stereo signal source is selected from one of a mobile smart phone device, a home entertainment system, a computer, or an electronic game system.

12. The sound enhancement module of claim 7 wherein the sound generator is selected from one of powered speakers, a vehicle radio and speaker system, headphones, or a virtual reality headset system.

* * * * *